April 22, 1941.    J. L. BROWN    2,238,925
TOTALLY ENCLOSED DYNAMOELECTRIC MACHINE
Filed Sept. 21, 1938    3 Sheets-Sheet 3

WITNESSES:
Edward Michaels
F. P. Lyle

INVENTOR
John L. Brown.
BY O. B. Buchanan
ATTORNEY

Patented Apr. 22, 1941

2,238,925

UNITED STATES PATENT OFFICE 2,238,925

TOTALLY ENCLOSED DYNAMOELECTRIC MACHINE

John L. Brown, Verona, Pa., assignor to Westinghouse Electric & Manufacturing Company, East Pittsburgh, Pa., a corporation of Pennsylvania Application September 21, 1938, Serial No. 230,962

8 Claims. (Cl. 171—252)

The present invention relates to dynamoelectric machines, and more particularly to electric motors of the totally enclosed type.

Totally enclosed motors are used where it is desired to protect the motor against dirt, injurious fumes, liquids or other foreign substances which may be present in the location where the motor is to be used. Such motors are also used where it is necessary to make the motor explosion resisting for use in locations where inflammable or explosive gases may occur. These motors are usually built with a frame and end brackets which completely enclose the rotor and stator core of the motor with their windings, and prevent access of the surrounding air to the interior of the frame. Special provision is made for cooling such motors in order to obtain the desired rating without direct ventilation by the surrounding air.

One difficulty often encountered in the operation of such motors is the accumulation of moisture in the interior of the motor as a result of breathing action caused by starting and stopping. When the motor is stopped, the air inside the frame cools off and its pressure decreases. A certain amount of air from the outside of the motor will, therefore, leak in through the small openings resulting from imperfect fits at the joints between the housing and end brackets, at the bearings, or at other places. This air leaking into the interior of the motor carries with it a certain amount of water vapor, which condenses on the interior surfaces. When the motor is started again, the interior air is heated up and expands, causing some of it to leak out through the joints of the frame, but this air does not carry with it the moisture which was previously carried into the motor and it remains on the inside. Repeated starting and stopping of the motor over a period of time results in the accumulation of a considerable amount of moisture in the interior of the motor, which will eventually impair the insulation of the windings, and may cause other serious damage. This breathing action, resulting from starting and stopping of the motor, may also carry more or less dust or dirt from the surrounding air into the interior of the motor, which is also undesirable.

The accumulation of moisture inside the motor may be eliminated by the use of breathers on the motor frame, which provide a path for the circulation of a definite but small amount of air between the interior and exterior of the motor during operation. This circulation of air, or breathing, evaporates any moisture which may exist inside the motor and carries it to the outside, thus preventing any accumulation of moisture. It can be shown by actual test that a small amount of water deliberately placed inside the frame can be removed in this manner. When applied to totally enclosed motors which are also explosion resisting, such breathers should be designed to provide a path for the air which will meet the usual safety requirements for explosion resisting motors, i. e., a path which will be sufficiently long and thin to cool gases escaping from the motor as a result of an internal explosion below the temperature at which they would ignite inflammable or explosive gases in the air surrounding the motor.

The object of the present invention is to provide a totally enclosed dynamoelectric machine having breathing means incorporated in the bearing assemblies to prevent the accumulation of moisture in the interior of the motor.

More specifically, the object of the invention is to provide a bearing assembly for a totally enclosed electric motor which will provide for the circulation of a small amount of air through the bearing assembly between the interior and exterior of the motor to remove any moisture which may be present inside the motor.

A further object is to provide a breathing means for a totally enclosed motor which is combined with the bearing assembly and which can readily be made explosion resisting.

Still another object is to provide a breathing means incorporated in the bearing assembly which will effectively prevent the entrance of dust or dirt into the interior of the motor.

Other objects and advantages of the invention will be apparent from the following detailed description taken in connection with the accompanying drawings, in which.

Figure 1:
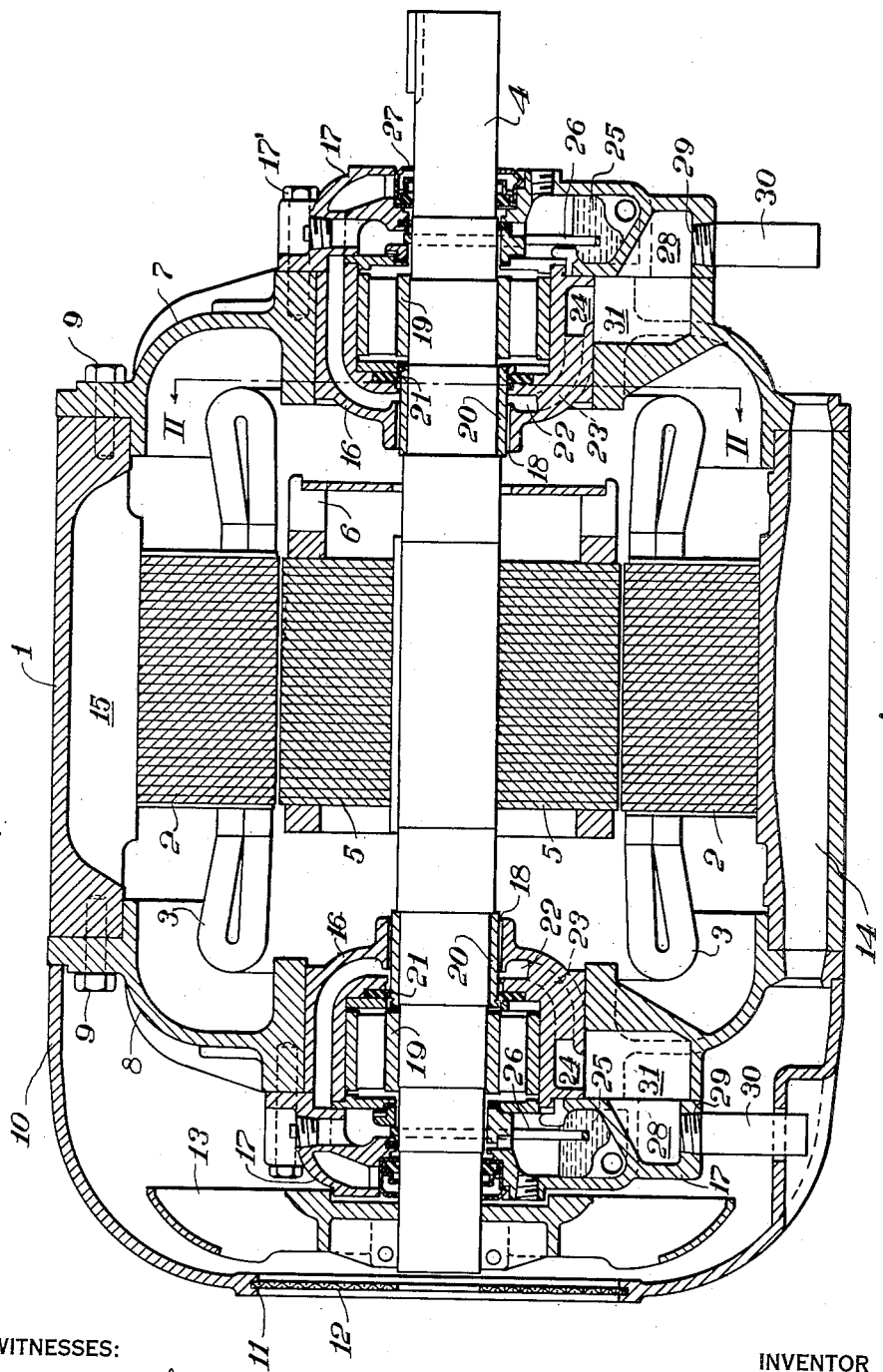
Figure 1 is a longitudinal section through a totally enclosed electric motor.
Figure 2:
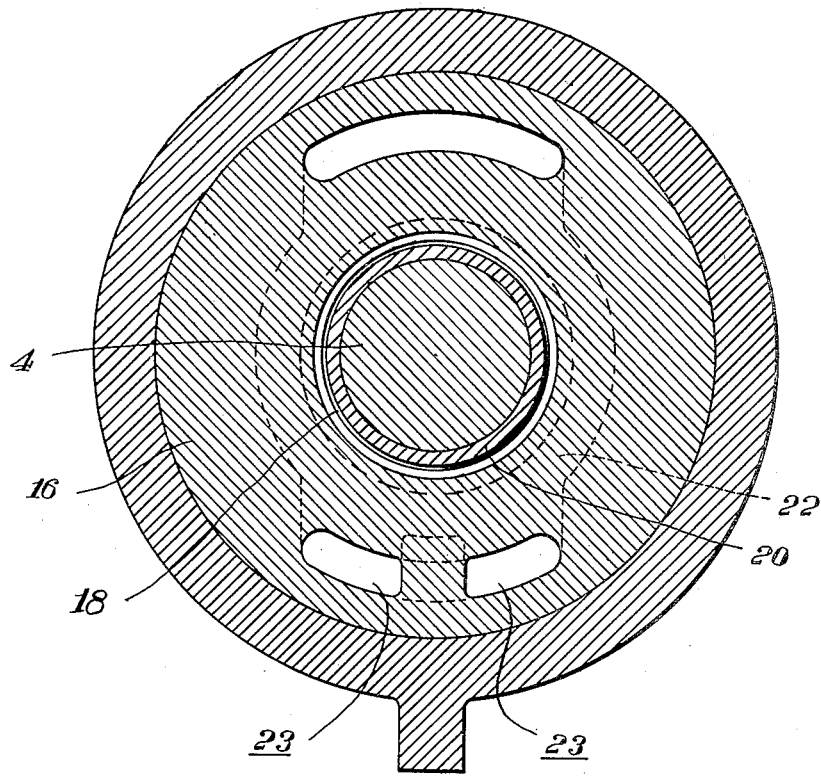
Fig. 2 is a fragmentary transverse sectional view on a larger scale, on the line II—II of Fig. 1.

The motor shown in Fig. 1 has a frame 1 which completely encloses the motor and in which a stator core 2 of the usual laminated construction is supported. Suitable windings 3 are placed in slots in the stator core. The motor has a shaft 4 on which is secured a rotor member 5, of any suitable construction, and a blower 6 is secured to one end of the rotor member to circulate the air inside the housing. The ends of the motor are enclosed by end brackets 7 and 8, respectively, which are secured to the frame 1 by means of screws 9, so as to provide a substantially air tight and dust tight enclosure for the motor.

In order to provide adequate cooling for the motor, the end bracket 8 is of double wall construction, having an outer hood member 10 which is provided with a central opening 11. The opening 11 may be covered by a suitable screen 12 to prevent the entrance of dirt. The shaft 4 extends beyond the bracket 8 and a blower 13 is secured to the end of the shaft in the space between the bracket 8 and hood 10. This blower draws air in through the opening 11 and forces it through longitudinal passages 14 formed in the frame. The internal blower 6 circulates the air in the interior of the frame through the ventilating passages in the stator and rotor members, around the windings 3, and through passages 15 between the stator core 2 and the frame 1, so that adequate cooling is assured.

The shaft 4 is supported in bearing units mounted in each of the end brackets 7 and 8. The bearings may be of any desired type but have been shown as anti-friction bearings and, since the assemblies are identical at both ends of the machine, only one will be described in detail. Each bearing assembly consists of a cartridge 16, which is supported in a bore in the end bracket, and a bearing housing member 17, which is secured to the exterior of the bracket by screws 17'. A roller bearing unit 19 is mounted in the cartridge 16 and supports the shaft for rotation. A sleeve 20 is secured on the shaft inside the bearing 19, and a gasket 21 is provided to seal the bearing against leakage of oil along the shaft. The cartridge also has an inwardly extending boss which provides a bore 18 surrounding the shaft and having a small annular clearance from the sleeve 20. An annular space 22 is formed in the cartridge adjacent the end of the bore 18 and communicating with it, and two passages 23 are formed in the lower part of the cartridge extending from the annular space 22 to a recess 24 in the bottom of the cartridge, thus providing a path for the circulation of air from the inner end of the bore through the recess 24.

The housing member 17 has an oil reservoir 25 in its lower part from which oil is supplied to the bearing by means of an oil ring 26. A suitable oil seal and dust cap 27 is provided surrounding the shaft to prevent the entrance of dirt into the bearing and the leakage of oil along the shaft. At the bottom of the housing 17 a chamber 28 is formed having a hole 29 in its lower surface in which a short length of pipe 30 may be threaded, if desired. The chamber 28 communicates with the recess 24 in the cartridge through a recess 31 in the bracket 7. It will be seen, therefore, that a path is provided for a small amount of air to circulate between the interior and exterior of the motor through the pipe 30, chamber 28, recesses 31 and 24, passages 23, annular space 22 and bore 18.

The pipe 30 leading to the bearing assembly in the bracket 8 is brought out through the hood 10 so that the breathing action will not be affected by the air pressure produced by the blower 13.

In operation, when the motor is running, the blower 6 causes a difference in pressure in the air inside the frame at opposite ends of the motor. As a result of this difference in pressure, a small amount of air will flow into the motor through the path described above in the bearing assembly at one end, and a similar amount of air will flow out through the corresponding path in the bearing assembly at the opposite end. Thus, when the motor is in operation, there will be a small but definite circulation of air through the motor which will evaporate and remove any moisture that may have accumulated in the interior of the frame.

If the motor is designed to be explosion resisting, the length and clearance of the bore 18 surrounding the shaft will be made to conform to the usual requirements for such motors to give a sufficiently long and thin path for hot gases escaping from the motor to cool them below a dangerous temperature.

The construction described above serves not only as a very effective breather to remove moisture from the interior of the motor, but will also serve to prevent the entrance of dust or dirt into the interior. Thus, when this construction is used, all joints in the frame and between the frame and brackets can be sealed to make them completely dust tight so that the only path for entrance of dust or dirt into the motor is through the breathers. The chamber 28 in the bearing housing 17 acts as a settling chamber which effectively removes all dust and dirt from the air passing through the breather passages so that no dust can enter the interior of the frame. In case the dust to be removed is very fine, or for any other reason cannot be completely removed by a settling chamber, suitable filtering material can be placed in the chamber 28 to completely filter the dust out of the air. Since the flow of air through the breathing means is very small, this filter can be made quite fine without interfering with a sufficient flow of air for the purpose desired.

Figure 4:
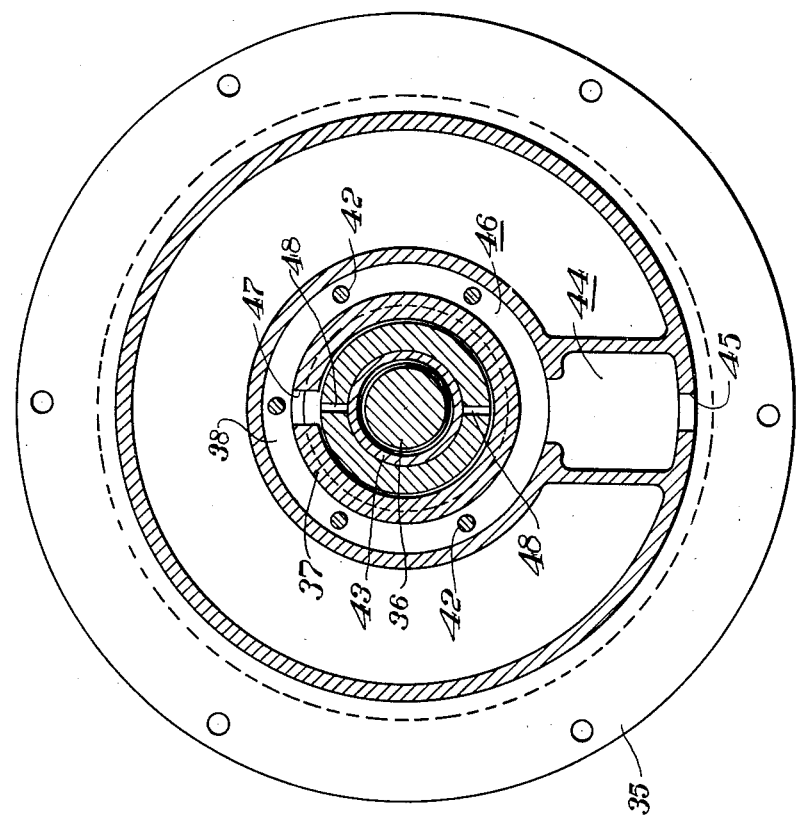
Fig. 4 is a sectional view on the line IV—IV of Fig. 3.
Figure 3:
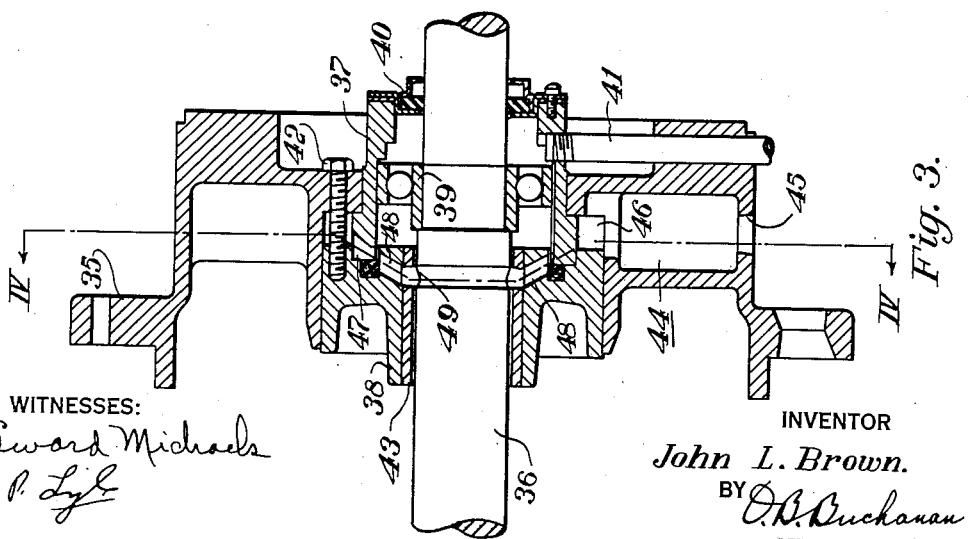
Fig. 3 is a longitudinal sectional view through the end bracket and bearing of a totally enclosed electric motor, showing another embodiment of the invention.

Another embodiment of the invention is shown in Figs. 3 and 4. These figures show an end bracket 35 which is intended to be secured to the frame of a totally enclosed motor which may be similar to that shown in Fig. 1. The motor shaft 36 is supported by an anti-friction bearing unit in the bracket 35. The bearing assembly consists of a cartridge 37 and an inner bearing cap 38. A ball bearing unit 39 is mounted in the cartridge 37 and supports the shaft 36 for rotation. A suitable dust cap 40 is provided to prevent the entrance of dirt into the bearing and the escape of oil along the shaft. A pipe 41 may be threaded into the outer end of the cartridge to permit connection of a suitable oiling device to provide lubrication for the bearing. The cap 38 is clamped against the cartridge by screws 42 passing through the bracket 35 and has a sleeve member 43 which forms a bore surrounding the shaft and providing a small clearance around it.

A chamber 44 is formed in the bracket 35 below the bearing assembly and communicates with the outside air by means of a hole 45. Air enters through this hole and passes through the chamber 44 into an annular space 46 formed between the bearing cap and the bracket. From this space the air passes through a slot 47 in the upper part of the bearing cartridge 37, and then into an annular clearance space between the cartridge and bearing cap, and through holes 48 in the bearing cap 38 into an annular space 49 surrounding the shaft. This space 49 communicates with the bore of the sleeve 43, and thus permits the air to flow to or from the interior of the motor. It will thus be seen that a clear path is provided for the circulation of a small quantity of air between the interior and exterior of the motor through the bearing assembly.

The operation of this form of the invention is the same as that described above. The internal blower creates a difference in pressure between the two ends of the motor, and causes air to flow in through the passages in the bearing assembly at one end and out through the corresponding passages at the other end, carrying with it any moisture which may have been present in the interior of the motor. As in the first described embodiment of the invention, the chamber 44 acts as a settling chamber to remove dust or dirt from the air passing through the breather and, if desired, filtering means may be placed in this chamber to more completely remove the dust. This form of the invention may also easily be designed to be explosion resisting by making the length and clearance of the bore of the sleeve 43 of the proper dimensions to meet the usual safety requirements.

It will be seen, therefore, that, in either embodiment of the invention, a very effective breathing means has been provided for removing moisture from the interior of a totally enclosed motor by permitting the circulation of a small amount of air through the bearing assembly of the motor during operation, so that the moisture is removed by breathing action. This is accomplished by providing suitable passages in the bearing assemblies at each end of the motor through which the air may flow, and which are arranged to effectively remove dust and dirt from the air and to be easily made explosion resisting.

Although two specific embodiments of the invention have been illustrated and described, it is to be understood that it is not limited to the specific details of construction shown but that, in its broadest aspect, it includes all equivalent modifications and embodiments which come within the scope of the appended claims.

I claim as my invention:

1. A dynamoelectric machine having a frame and end brackets which completely enclose the machine, a shaft, a bearing assembly mounted in each end bracket, each of said bearing assemblies comprising a cartridge member containing an anti-friction bearing in which the shaft is supported for rotation, said cartridge member having a bore at its inner end closely surrounding the shaft and a passage formed in it communicating with the bore, and a housing member secured to the outer end of the cartridge member, said housing having a chamber formed in it with an opening to the air outside the machine, said cartridge and housing being so arranged that the passage in the cartridge communicates with the chamber in the housing to provide a path for the flow of a small amount of air through the bearing assembly.

2. A dynamoelectric machine having a frame and end brackets which completely enclose the machine, a shaft, a bearing assembly mounted in each end bracket, each of said bearing assemblies comprising a cartridge member containing an anti-friction bearing in which the shaft is supported for rotation, said cartridge member having a bore at its inner end closely surrounding the shaft and a passage formed in it communicating with the bore, and a housing member secured to the outer end of the cartridge member, said housing having a chamber formed in it with an opening to the air outside the machine, said cartridge and housing being so arranged that the passage in the cartridge communicates with the chamber in the housing to provide a path for the flow of a small amount of air through the bearing assembly, and filtering material in said chamber to remove dust from the air.

3. A dynamoelectric machine having a frame and end brackets which completely enclose the machine, a shaft, a bearing assembly mounted in each end bracket, each bearing assembly including an anti-friction bearing in which the shaft is supported for rotation and having a member which provides an inwardly extending bore closely surrounding the shaft, said bearing assembly having a connecting series of openings and passages which form a path for the flow of air extending from said bore to the outer periphery of the assembly, the end bracket having a chamber formed therein which communicates with said air path and which has an opening to the air outside the machine whereby a small amount of air may flow through the bearing assembly between the interior and exterior of the machine.

4. A dynamoelectric machine having a frame and end brackets which completely enclose the machine, a shaft, a bearing assembly mounted in each end bracket, each bearing assembly including an anti-friction bearing in which the shaft is supported for rotation and having a member which provides an inwardly extending bore closely surrounding the shaft, said bearing assembly having a connecting series of openings and passages which form a path for the flow of air extending from said bore to the outer periphery of the assembly, the end bracket having a chamber formed therein which communicates with said air path and which has an opening to the air outside the machine whereby a small amount of air may flow through the bearing assembly between the interior and exterior of the machine, and filtering material in said chamber to remove dust from the air.

5. A dynamoelectric machine having a frame and end brackets which completely enclose the machine, a stator member supported in the frame, a bearing assembly mounted in each end bracket, a rotor member having a shaft supported for rotation in said bearing assemblies, each of the bearing assemblies comprising a bearing supporting element, a bearing mounted in said supporting element, and a bearing housing element surrounding the rotor shaft and forming a part of the bearing assembly, one of said elements having a bore which closely encircles the shaft and a passage therethrough which communicates with the bore, the other of said elements and the end bracket having a channel extending through them which communicates with said passage, said channel including a chamber which has an opening to the air outside the machine.

6. A dynamoelectric machine having a frame and end brackets which completely enclose the machine, a stator member supported in the frame, a bearing assembly mounted in each end bracket, a rotor member having a shaft supported for rotation in said bearing assemblies, each of the bearing assemblies comprising a bearing supporting element, a bearing mounted in said supporting element, and a bearing housing element surrounding the rotor shaft and forming a part of the bearing assembly, one of said elements having a bore which closely encircles the shaft and a passage therethrough which communicates with the bore, the other of said elements and the end bracket having a channel extending through them which communicates with said passage, said channel including a chamber which has an opening to the air outside the machine, said chamber containing filtering material to remove dust from the air.

7. A dynamoelectric machine having a frame and end brackets which completely enclose the machine, a stator member supported in the frame, a bearing assembly mounted in each end bracket, a rotor member having a shaft supported for rotation in the bearing assemblies, each of said bearing assemblies including a bearing in which the shaft is supported and a member having a bore closely encircling the shaft, said member having a passage therethrough which communicates with the bore, and the bearing assembly and end bracket having a connecting series of openings and passages communicating with the first mentioned passage to form a channel for the flow of a small amount of air, said channel including a chamber which has an opening to the air outside the machine.

8. A dynamoelectric machine having a frame and end brackets which completely enclose the machine, a stator member supported in the frame, a bearing assembly mounted in each end bracket, a rotor member having a shaft supported for rotation in the bearing assemblies, each of said bearing assemblies including a bearing in which the shaft is supported and a member having a bore closely encircling the shaft, said member having a passage therethrough which communicates with the bore, and the bearing assembly and end bracket having a connecting series of openings and passages communicating with the first mentioned passage to form a channel for the flow of a small amount of air, said channel including a chamber which has an opening to the air outside the machine, said chamber containing filtering material to remove dust from the air.

JOHN L. BROWN.